United States Patent [19]

Connolly

[11] Patent Number: 4,922,683

[45] Date of Patent: May 8, 1990

[54] SHRINK BANDING MACHINE

[75] Inventor: Thomas Connolly, Nashua, N.H.

[73] Assignee: Austin-Gordon Design, Inc., Nashua, N.H.

[21] Appl. No.: 269,871

[22] Filed: Nov. 10, 1988

[51] Int. Cl.[5] .............................................. B32B 31/00

[52] U.S. Cl. .......................................... 53/296; 53/64; 53/291; 53/585

[58] Field of Search ................. 53/291, 298, 297, 296, 53/64, 292, 295, 585

[56] References Cited

U.S. PATENT DOCUMENTS

| | | | |
|---|---|---|---|
| 3,069,303 | 2/1960 | Scholle | 156/253 |
| 3,320,720 | 4/1964 | Murray | 53/182 |
| 3,489,636 | 1/1968 | Wilson | 156/426 |
| 3,530,773 | 9/1970 | Kuhnle et al. | 93/12 |
| 3,543,467 | 12/1970 | Leasure | 53/28 |
| 3,548,563 | 12/1970 | Leasure | 53/28 |
| 3,589,091 | 6/1971 | Cloud | 53/14 |
| 3,741,838 | 3/1969 | Christensen et al. | 156/173 |
| 3,756,485 | 9/1973 | Abrecht | 226/44 |
| 3,861,984 | 1/1975 | Poulsen | 156/425 |
| 3,868,895 | 3/1975 | Hart et al. | 93/84 TW |
| 3,924,387 | 12/1975 | Konstantin | 53/291 |
| 3,940,834 | 3/1976 | Lajovic | 425/403 |
| 3,962,019 | 6/1976 | Rejeski | 156/428 |
| 3,974,912 | 8/1976 | Buisson | 206/303 |
| 4,016,704 | 4/1977 | Fujio | 53/296 X |
| 4,054,474 | 10/1977 | Collins, III et al. | 156/86 |
| 4,102,728 | 7/1978 | Smith | 53/291 X |
| 4,230,030 | 10/1980 | Hanson et al. | 93/35 SB |
| 4,365,460 | 12/1982 | Cress et al. | 53/563 |
| 4,412,876 | 11/1983 | Lerner et al. | 53/291 X |
| 4,416,714 | 11/1983 | Hoffman | 156/86 |
| 4,446,616 | 5/1984 | Waterman | 29/775 |
| 4,447,280 | 5/1984 | Malthouse | 156/85 |
| 4,497,156 | 2/1985 | Scheidegger | 53/399 |
| 4,514,966 | 5/1985 | Konstantin | 53/291 X |
| 4,529,471 | 7/1985 | Vaughan | 156/466 |
| 4,545,832 | 10/1985 | Hoffmann | 156/86 |
| 4,561,928 | 12/1985 | Malthouse | 156/497 |
| 4,600,371 | 7/1986 | Fresnel | 425/110 |
| 4,619,104 | 10/1986 | Germunson | 53/459 |
| 4,693,059 | 9/1987 | O'Donnell | 53/567 |
| 4,806,187 | 2/1989 | Fujisawa | 53/291 X |

OTHER PUBLICATIONS

Advertisement for Series PD Pouch Dispenser by Austin–Gordon Design, Inc., (no date).
Advertisement for SHRINKSEALER Model 45 by PDC International Corporation, (no date).
Advertisement for SLEEVELABELLER Series R by PDC International Corporation, (no date).
Advertisement for SHRINKSEALER Model 65 by PDC International Corporation, (no date).
Advertisement for SHRINKBANDER Model F-180 by PDC International Corporation, (no date).

*Primary Examiner*—James F. Coan
*Attorney, Agent, or Firm*—Lahive & Cockfield

[57] ABSTRACT

A banding machine provides for a controlled intermittent flow of a tubular web or sleeve of thin plastic material from a storage reel, over a tensioning arm and guiding rollers onto a group of machine elements which first open the tube somewhat, stop the flow of material, slice the tube transversely, and pass the cut segment of web over a floating mandrel to form it into the shape of a container positioned below it, while continuing the flow of tubing from the reel down onto the same group of elements to form the next band. The open segment of band is now placed over the container automatically to complete the banding operation.

23 Claims, 12 Drawing Sheets

SHRINK BANDING MACHINE

BACKGROUND OF THE INVENTION

This invention relates in general to packaging machinery and more particularly to a method and machine for automatically taking a continuous hollow web of a thin plastic material, directing it through a cutter to slice the web transversely forming individual segments, and to move said segments over a container, such as a bottle, where the segment can subsequently be shrink-wrapped.

There have been a wide number of techniques developed for performing operations, in the shrink-wrapping of band labels for containers. These techniques have been employed to form, around a container, individual band sleeves from a continuous roll of a flattened tubular web of thin flexible plastic. A suitable apparatus provides for opening the tube to slip it over the container and to provide means for cutting off an individual label for each container. The usual automatic arrangement includes a table top conveyor to provide the container either in a continuous motion or intermittent motion to a work station where the shrink wrap band is placed over it. The conveyor then carries the banded container to another work station for performing the shrink operation itself. There are at least two critical characteristics that such a system must have. One is that it operate at relatively high speed so that the throughput of the operation is economical. A second is that it be relatively free of jams so that production does not get interrupted.

Much of the development in the art has focused on the problem of how to open the tube or web for placement over the container and how to cut or slice the web transversely while still maintaining a driving force for the web after it has been segmented to carry it over the bottle. Generally, it has not proven feasible to cut the web in an open or partially open position. Thus much of the art has been directed towards the use of blowers, vacuum and the like to open the tubular web after it has been cut and also to a means for carrying the cut segment of the tubing in the open condition over the container, or other object being banded.

One device which has been used frequently as one element in such a banding apparatus is referred to as a "floating mandrel" which provides for defining the tube in an open shape and to provide means for placing that open shape over the container. In one approach the web is cut at a point overlying the mandrel by a razor edge which circumscribes the web on the mandrel. Another approach has been to sever the web segment while it is in the bottle, either by using a perforated web and breaking it at the perforation line, or cutting the continuous web at a point just above the top of the bottle.

SUMMARY OF THE INVENTION

It is therefore a primary object of the present invention to provide a machine for forming from a continuous roll or web of flexible thin plastic tubing, individual banding labels and placing them over the containers to be banded.

Another object of the present invention is to provide a machine for feeding a continuous web of flattened flexible thin plastic tubing into a system which slightly opens the tubing, cuts the opened tubing, thereafter forms the tubing over a floating mandrel to the shape of the container, and, finally passes the properly shaped segment of tubing over the container itself.

Broadly speaking, in the present invention a machine provides for a controlled intermittent flow of the tubular web or sleeve of thin plastic material from a storage reel, over a tensioning arm and guiding rollers onto a group of machine elements which first open the tube somewhat, stop the flow of material, slice the tube transversely, and pass the cut segment of web over a floating mandrel to form it into the shape of a container positioned below it, while continuing the flow of tubing from the reel down onto the same group of elements to form the next band. The open segment of band is now placed over the container automatically to complete the banding operation.

It is a feature of this invention that the transverse cutting of the web is done with the web at least partially opened by a pair of reciprocating shear blades and that the system provides for continued passage of the now severed segment of the tubing over a floating mandrel to form the final open shape of the tube and place that open, shaped segment over the container.

The container is normally one of a row of containers carried on a suitable conveyor, such as a tabletop conveyor, which brings the containers to be banded one at a time underneath the banding machine work station.

DESCRIPTION OF PREFERRED EMBODIMENTS

Figure 1:
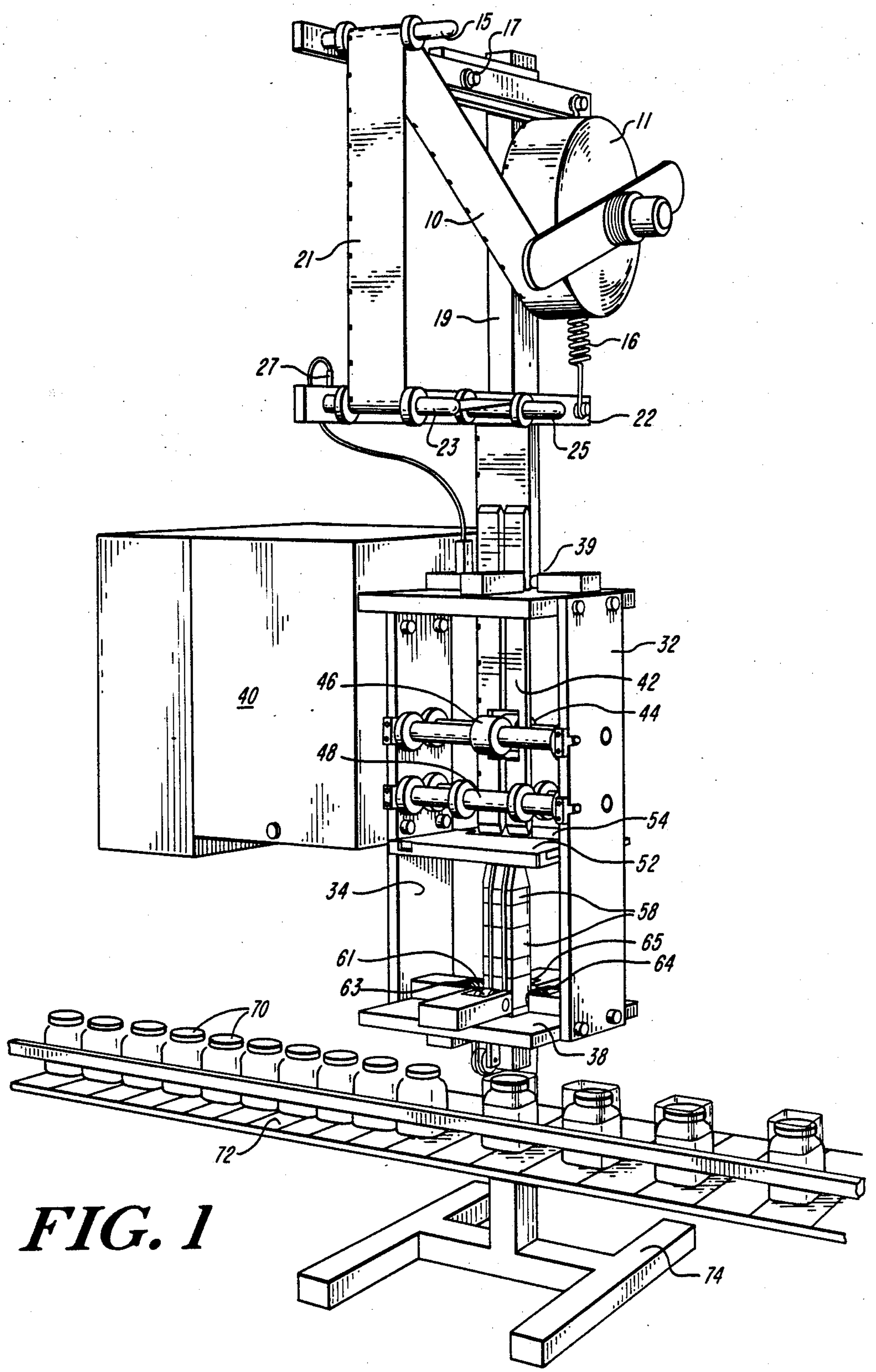
FIG. 1 is a perspective view of a banding machine constructed in accordance with the principles of this invention.

FIG. 1 is an overall perspective view of the label banding machine of this invention. The machine draws the thin flexible plastic sleeve or web 10 in a flattened condition from storage roll 11. The roll is mounted on a post 19 which forms the main frame member of the machine. The post 19 is attached to cabinet 40, which, as will be described later, contains many of the control elements for the machine. The post 19 continues to an H-shaped base member 74 on the floor. The purpose of the machine is to place a band of the flexible plastic sleeve over each of containers 70, traveling along the tabletop conveyor 72 (or other suitable conveying means) as each container reaches a point underneath the banding machine. The bands are placed over each of the containers 70, later to be shrunk in a process in which the shrink bands are used for tamper proof seals or body labels.

The sleeve or web 10 may carry labeling information on it, or may be clear, but in any case should have registration marks along one edge, as illustrated at 21, to provide for control of the length of each band as it is cut to be placed over the container. Alternatively this length determination could be made by employing a shaft encoder on any one of the shafts which rotate in conjunction with the travel of the web to provide an output signal.

The manner of storing the web 10 on the reel and providing for its tensioning and leading it to the tensioning device are all conventional in the art. The reel 11 is rotatably mounted on the frame post 19 and the web 10 is drawn over a tensioning arm 15 and thence down to idler roller 23, across to a second idler roller 25, which is vertically aligned with the guiding elements in the machine. The tensioning roller 15 is part of a conventional dancer mechanism which includes arm 17 pivoted with respect to the frame member 19 and having a spring 16 fastened between it and bracket member 22 which supports the two idler rollers 22 and 23. In addition a brake arrangement (not shown) is included, as is usual with this general type of feed mechanism. Thus when the web 10 is being drawn from the roll 11, the tensioning roller 15 moves downward about pivot point 17 stretching spring 16, and loosening belt wrap on brake pulley, thus decreasing unwind tension allowing web to be pulled downward.

When the drive pulling down the web is stopped, the dancer roll rises by spring tension thus tightening the belt and stopping roll inertia.

Sensor 27 is mounted on bracket arm 22. This sensor 27, which tYpically is an light beam photosensor combination, provides an output signal as any one of the registration marks 21 on the web pass by it. As will be described in further detail below, this output signal is used to stop the web drive when a specific length of web has passed beyond the cutter plane and thereby controls the length of each segment which forms the banding sleeve placed on each container 70.

An open, generally rectangular frame contains the mechanisms which provide the feed drive for the web 10, open the web feed from its flattened condition, slice the web transversely to form the banding segments and transport these banding segments vertically onto the containers. This frame is formed of an upper horizontal platform 39 supported by two vertical side members 32 and 34, with a second horizontal platform 38 forming the bottom member of the frame. The frame is bolted to a box member 40 which is fastened to the main supporting post 19.

There are four principal operating mechanisms contained within the frame. The uppermost is a generally rectangular shaped planar member 42, which is itself illustrated in FIGS. 5, 6, 7, 8 and 8*a*. The second is drive roller 44 which is mounted on driven shaft 88 and in cooperation with friction driven roller 46, provides the drive for feeding the web 10 from the upper roll 11 down over the planar member 42.

Located just below the planar member 42 is a transverse cutting mechanism, which includes reciprocating blades 52 and 54. This mechanism, in response to control signals, performs the function of shearing the slightly opened web as it passes down from the planar member 42, thereby producing several cut segments of the tubular web 10 to form the bands. This cutting mechanism is illustrated in detail in FIGS. 10 and 11.

The fourth mechanism is an element for receiving the severed band, opening it fully transversely into the transverse shape of a container 70, then passing the shaped band onto a container 70. This mechanism includes a floating mandrel 58, included within the tubular web, and O-ring drives 104 and 106, as well as 104*a* and 106*a* for transport drive to the severed segment of the web. This mechanism also includes a further pair of O-rings 105 and 105*a*, which carry the severed web segment from the floating mandrel 58 onto the container 70, as generally illustrated at 70*a*. Details of this mechanism are illustrated in FIGS. 13 through 17.

THE PLANAR ELEMENT

Turning to the first mechanism, the planar element 42, this is formed of a smooth, strong plastic material, such as a acetal, manufactured under the trade name Delrin by DuPont Corporation. The element 42 is generally rectangular having a thickness which is small compared to the width dimension. The overall dimensions are selected such that the periphery dimension measured on a transverse line around the element 42 is substantially equal to the internal periphery taken transversely around the tubular web 10. The planar element 42 is formed as a split element joined by three turnbuckles 80, 81 and 82 each having opposite hand threads at opposite ends and a flat in the center to permit adjustment of the spacing between each side of the split planar element 42. The planar element is formed with a generally rectangular opening 86 through it. This window allows rollers 44 and 46 to form a nip for pulling the web downward without being against the surface of the planar element. This can also be accomplished by employing two pairs of rollers spaced apart laterally and providing openings through the planar element at the outside edges. It also includes, as is most clearly illustrated in FIG. 7, three idler rollers 22, 24 and 26 mounted in three openings within it. Typically the rollers would also be fabricated of Delrin. The purpose of this planar element 42 is to provide some opening of the flattened web such that it is opened by an amount equal to the thickness dimension of the planar element, and thereafter present a slightly opened web to the cutting mechanism for shearing.

Figure 8:
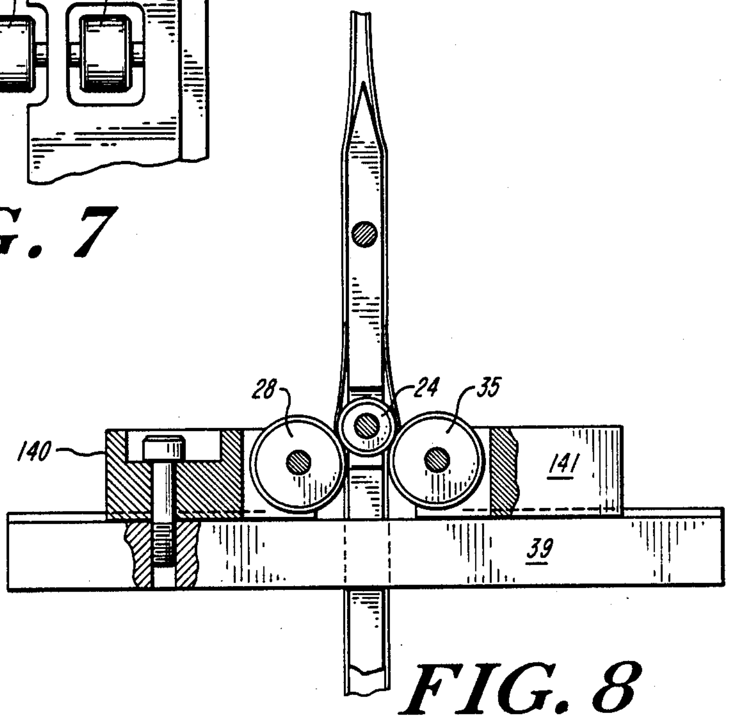
FIG. 8 is a cross sectional detail showing the method of support for the planar element of FIGS. 5 and 6 within the embodiment of FIG. 1.
Figure 8A:
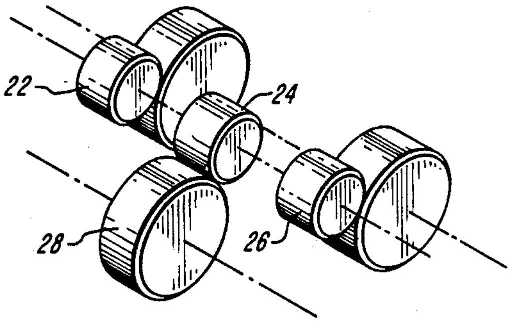
FIG. 8*a* is a generally isometric diagram of the support rollers illustrated in FIGS. 7 and 8.
Figure 9:
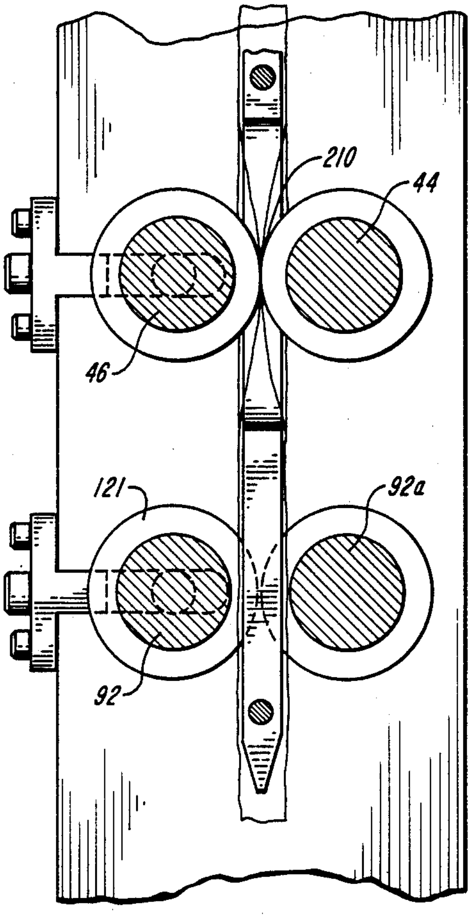
FIG. 9 is a side view of the feed drive mechanism of the embodiment shown in FIG. 1.
Figure 12:
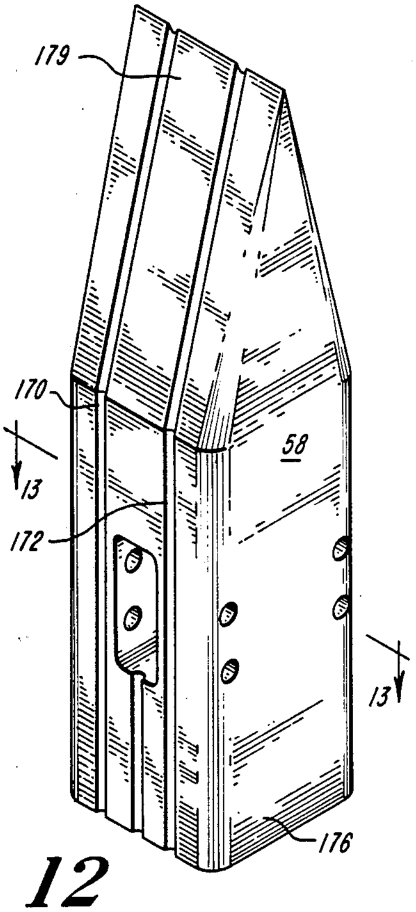
FIG. 12 is a perspective view of a floating mandrel employed in the embodiment of FIG. 1.

Since the planar element must be maintained within a moving web, it needs to be supported by elements which can allow the web to pass through them, while at the same time supporting the planar element within it. As illustrated in FIGS. 8 and 8*a*, this support is provided principally by the three rollers 22, 24 and 26 rotatably mounted within the planar element in cooperation with three rollers 28, 35 and 36 mounted on the plate 39 external to the web 10. The external rollers are free to rotate within positioning blocks 140 and 141. Typically these external rollers would be Delrin. By appropriate adjustment of the blocks containing the rollers, the planar element 42 is supported vertically. Side rollers 33*a* and 31*a* are rotatably mounted in blocks 31 and 33 to bear against the edges of the planar element 42 for horizontal side to side positioning. Further horizontal guidance is supplied by rollers 92 and 92A.

The space in between each half of the planar element 42 is adjustable by means of the turn buckles 80, 81 and 82. The lower turnbuckle 82 is adjusted to snug the web envelope at that vertical position. The middle turnbuckle 81 is adjusted to close the gap slightly at that position in order to compensate for the inward deflection of the web wall to provide passage through the nip of the rollers 44 and 46. The uppermost turn buckle 80 is adjusted to provide for nominal width of the planar element at the top to allow the tubular web to pass over it easily at that point. The planar element 42 may also include a spring member 83, formed of spring wire or a narrow spring strip fastened to threshold 82 with an outward spring force to help maintain the web open after cutting.

THE WEB FEED

Figure 4:
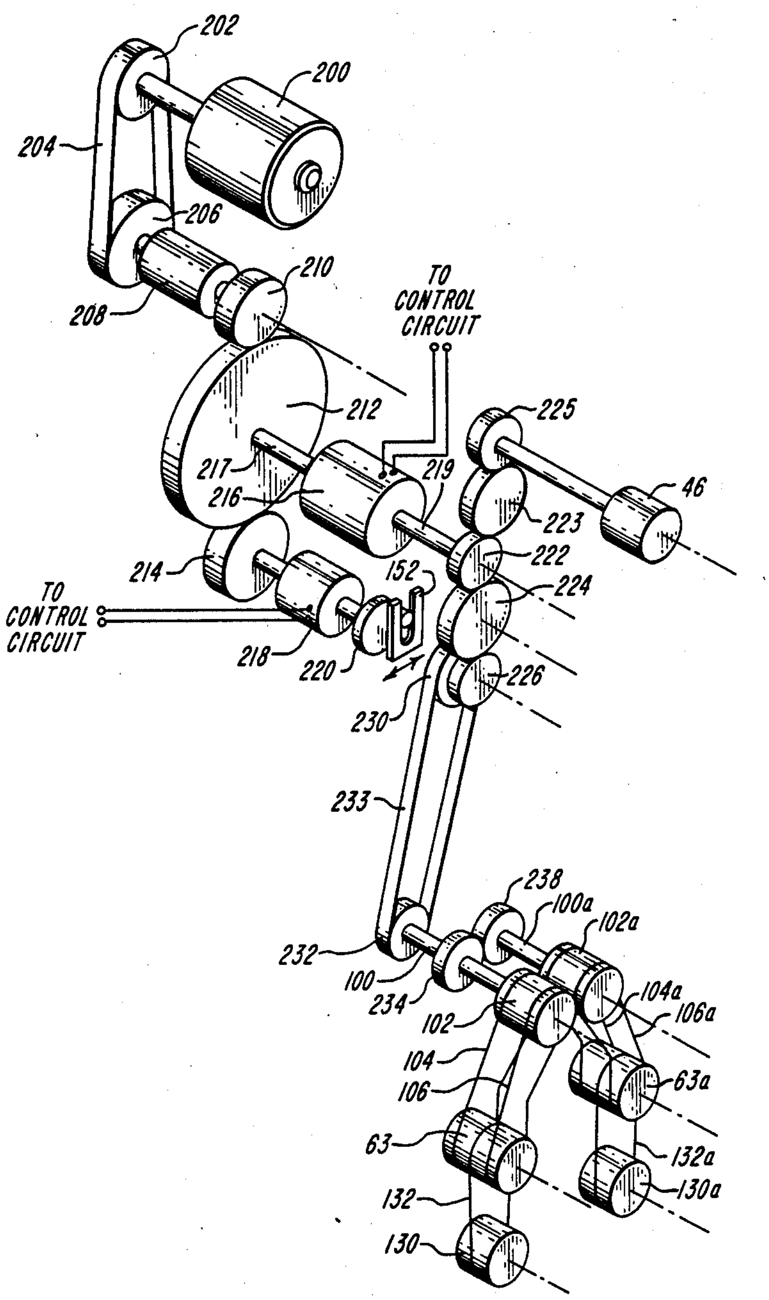
FIG. 4 is a generally isometric diagram view of the drive mechanism, clutch and transport mechanisms of the embodiment illustrated in FIG. 1.
Figure 5:
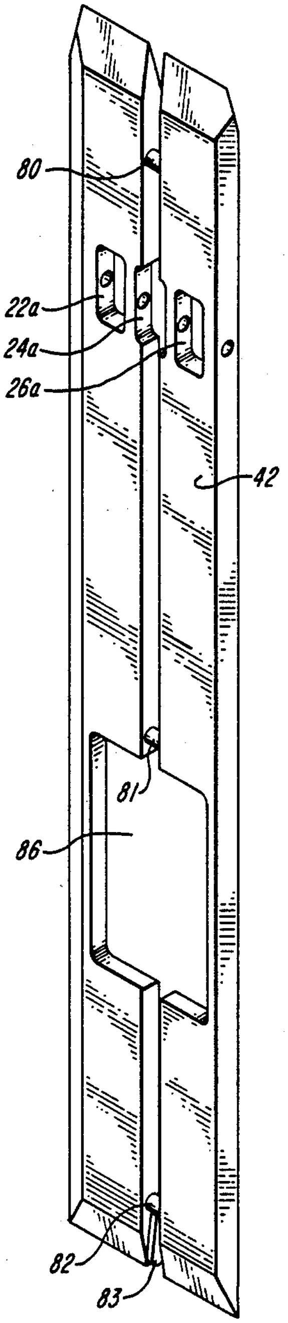
FIGS. 5 and 6 are two perspective views of a planar element employed in the embodiment of FIG 1.
Figure 6:
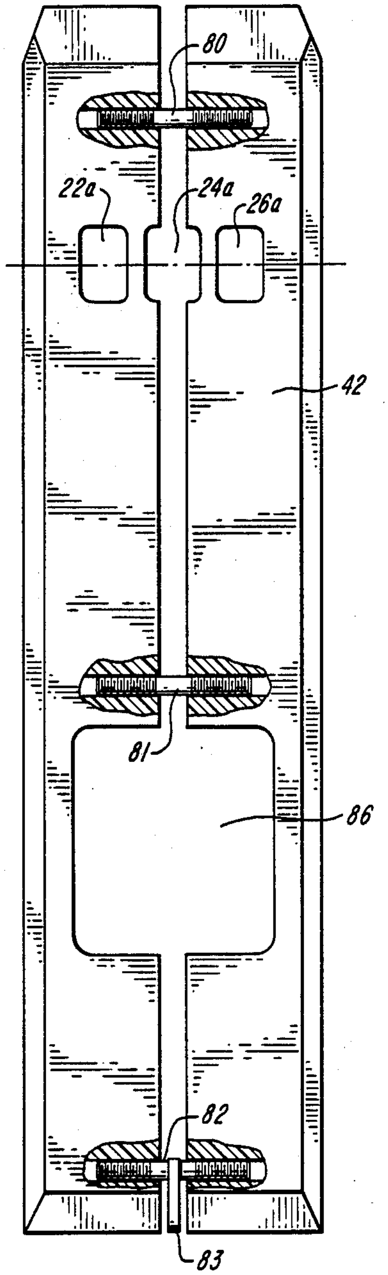
Figure 7:
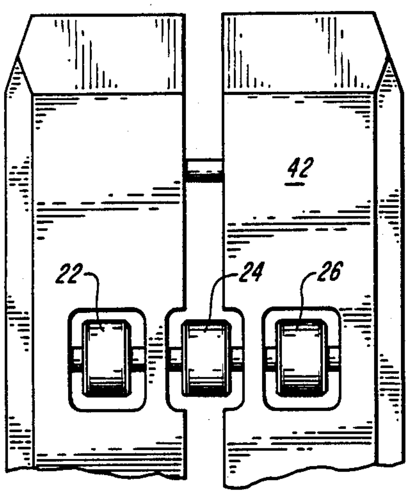
FIG. 7 is a detail of the upper portion of the planar element of FIGS. 5 and 6.
Figure 18:
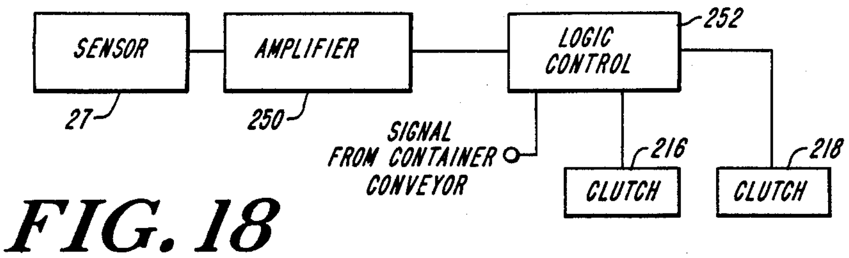
FIG. 18 is a block diagram of the control circuit used in conjunction with the embodiment of FIG. 1.
Figure 19:
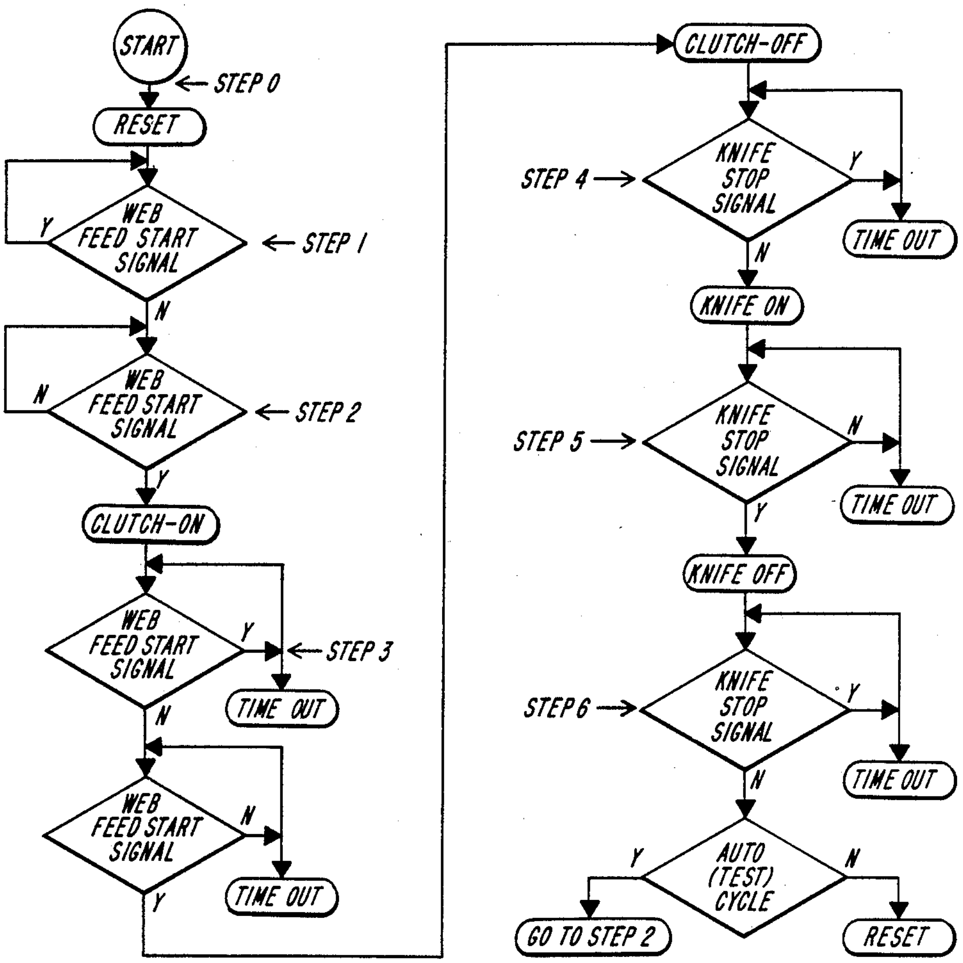
FIG. 19 is a logic flow chart of the operation of the logic control element of FIG. 18.

The drive means for pulling the web 10 from the roll 11 down over the planar element 42 and into the gap below element 42 where the transverse shearing blades cut the web into segments, includes drive roller 44, mounted on driven shaft 88, in conjunction with friction driven roller 46. The web material passes through the nip between these two rollers at the open window position 86 of the planar element. The manner in which shaft 88 is controlled to provide for stopping the transport of the web 10 to allow shearing blades to cut will be described below in conjunction with the description of the overall control and drive system as shown in FIGS. 4, 18 and 19.

THE FLOATING MANDREL AND O-RING TRANSPORT MECHANISM

The floating mandrel 58, together with the O-ring transport mechanism, provides for opening the web 10 to the cross sectional shape of the container 70 and moving the web down over an initial portion of the mandrel 58. After the web has been sliced at a vertical position between the bottom of the planar element 42 and the top of the mandrel 58, the O-rings provide for further transport of the severed segments of the web 10.

Details of the construction of the floating mandrel 58 and its method of support are illustrated in FIGS. 12 through 15. As shown there, the lower portion of the mandrel 58 is formed with a generally square cross section corresponding to the transverse shape of the containers 70. The upper portion of the mandrel 58 is tapered to an edge to accept the partially opened web as it moves from planar element 42. The mandrel 58 is formed with recesses 181 and 183 on the front and back face. Within each of the recesses is mounted a pair of freely rotating rollers, 124, 124*a* on the front face and 126 and 126*a* on the rear face. These rollers are conveniently formed Delrin, as is the general body 58 of the mandrel. Roller 63 is rubber coated and is formed with a central groove, corresponding to the location of grooves 127 and 128 in rollers 124 and 124*a*. These grooves allow for the passage of O-ring 104 and 106 through the nips formed by roller 63 and rollers 124 and 124*a*, without flattening the O-ring. Roller 63 is mounted on a block 184 adjustably attached to of the bottom plate 38 to provide for appropriate spacing to allow for passage through the nip of the severed segments of web, and also to maintain vertical support of the mandrel 58. A similar arrangement is provided on the backface of the mandrel 58 employing roller 65, mounted in block 186. Rollers 61 and 64 are rotatably mounted, one on either of the other two sides of the mandrel 58 to provide for horizontal positioning of the mandrel.

Figure 17:
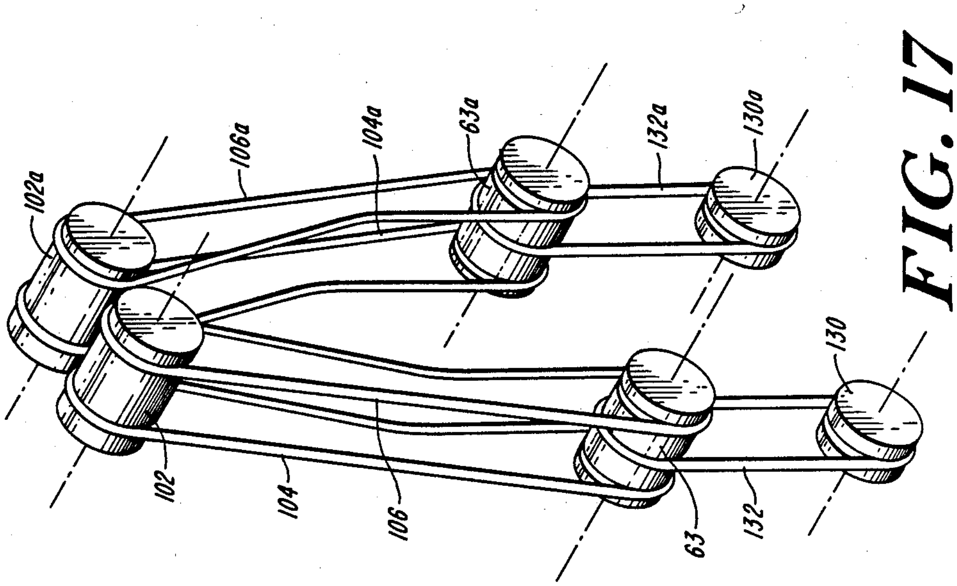
FIG. 17 is a generally diagrammatic illustration of the O-ring transport mechanism employed in the embodiment of FIG. 1.
Figure 16:
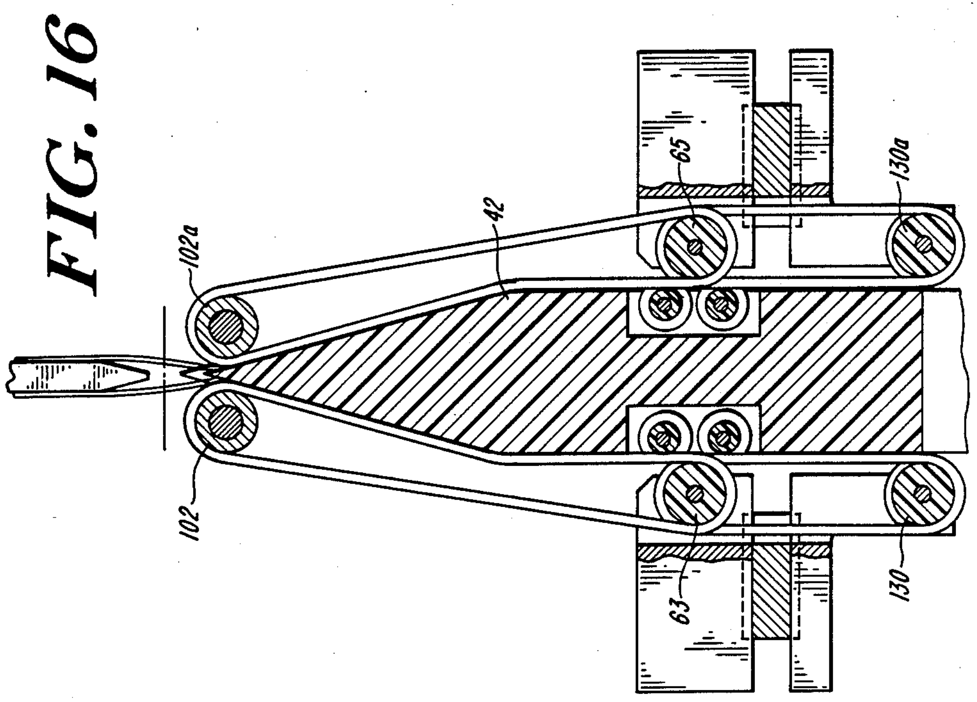
FIG. 16 is a cross section view of the floating mandrel supported within the embodiment of FIG. 1 and illustrating the O-ring transport mechanism.

The mechanism for providing the transport of the web over the floating mandrel 42 is perhaps most clearly illustrated in FIGS. 16 and 17. The purpose of this mechanism is to transport the lower end of the continuous web onto the upper portion of the mandrel 58 until the cutter shears the web at a point between the lower edge of the planar element and the top edge of the mandrel. Thereafter it transports the segments of web down around the floating mandrel 58 and eventually off the floating mandrel and onto the container 70. This movement of the web is effected by a series of O-rings 104, 106 and 132. O-ring 104, for example, is trained around aluminum drum 102 and thence down around roller 63. Both the roller 63 and the cylinder 102 are provided with grooves to retain the O-rings. In addition, as illustrated there are vertical grooves on the front and rear faces of the mandrel 58 to provide a track for the O-ring. A similar set of O-rings 104*a* and 106*a* provide the transporting force in the web on the backface of the mandrel 58. Additionally a single O-ring 132 on the frontface of mandrel 58 is positioned around roller 63 and extends down to and carries around bottom roller 130. The same arrangement is provided on the backface with roller 63*a*, O-ring 132*a* and bottom roller 130*a*. As will be discussed in detail with respect to FIG. 4, the drive for the O-rings is provided by rotating cylinders 102 and 102*a* in general synchronism with the rotation of the roller 44, which is acting as the transport drive for the main portion of the web 10. While the drive has been described in terms of the upper cylinders 102 and 102*a* being the driven members, it should be apparent that any of the sets of cylinders, around which the O-rings are trained may also serve that purpose. For example, cylinders 63 and 63*a* might be the driven cylinders with cylinders 102 and 102*a* being essentially idlers.

THE SHEARING MECHANISM

Figure 2:
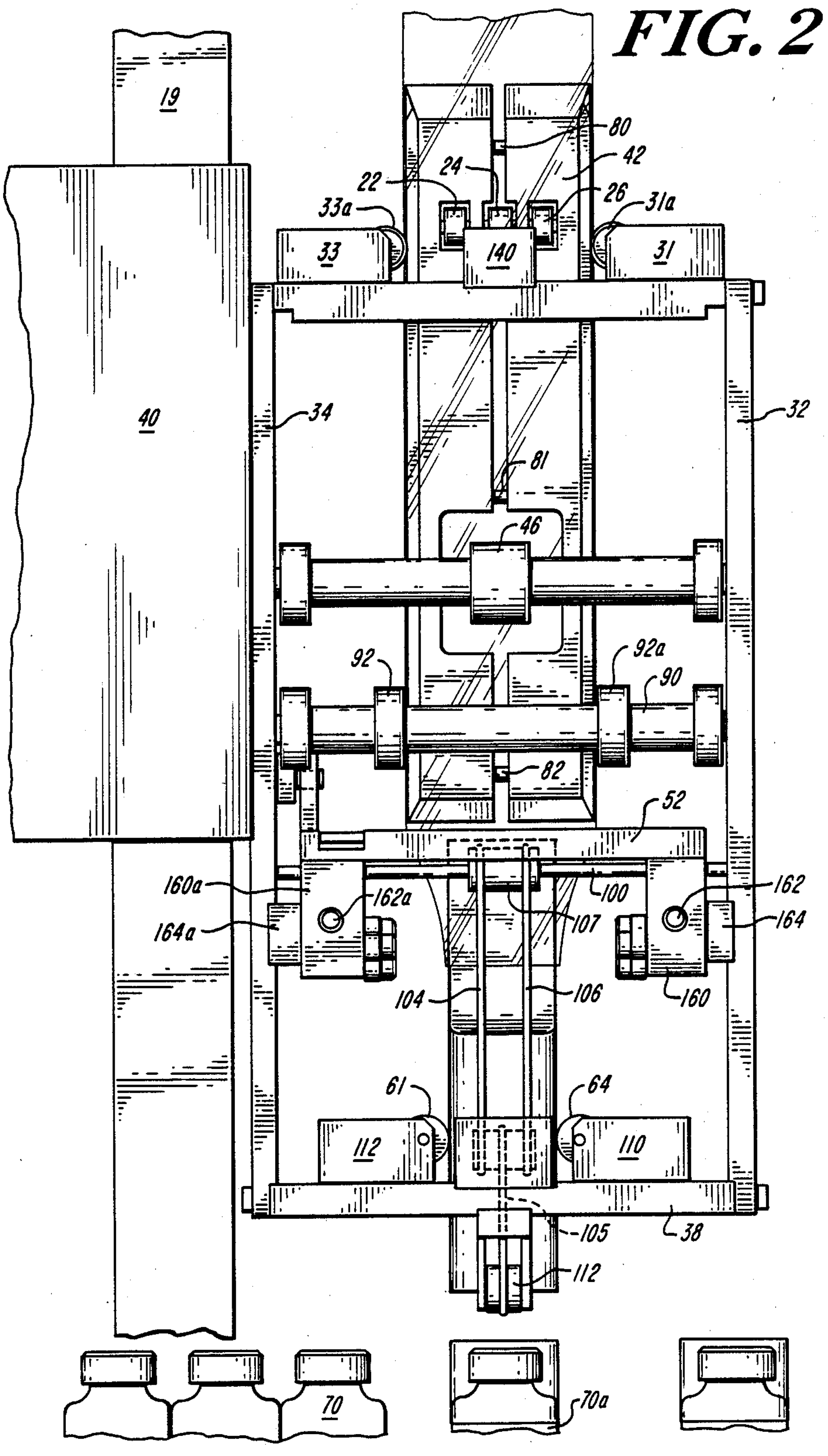
FIG. 2 is illustration of an expanded view of a portion of FIG. 1.
Figure 3:
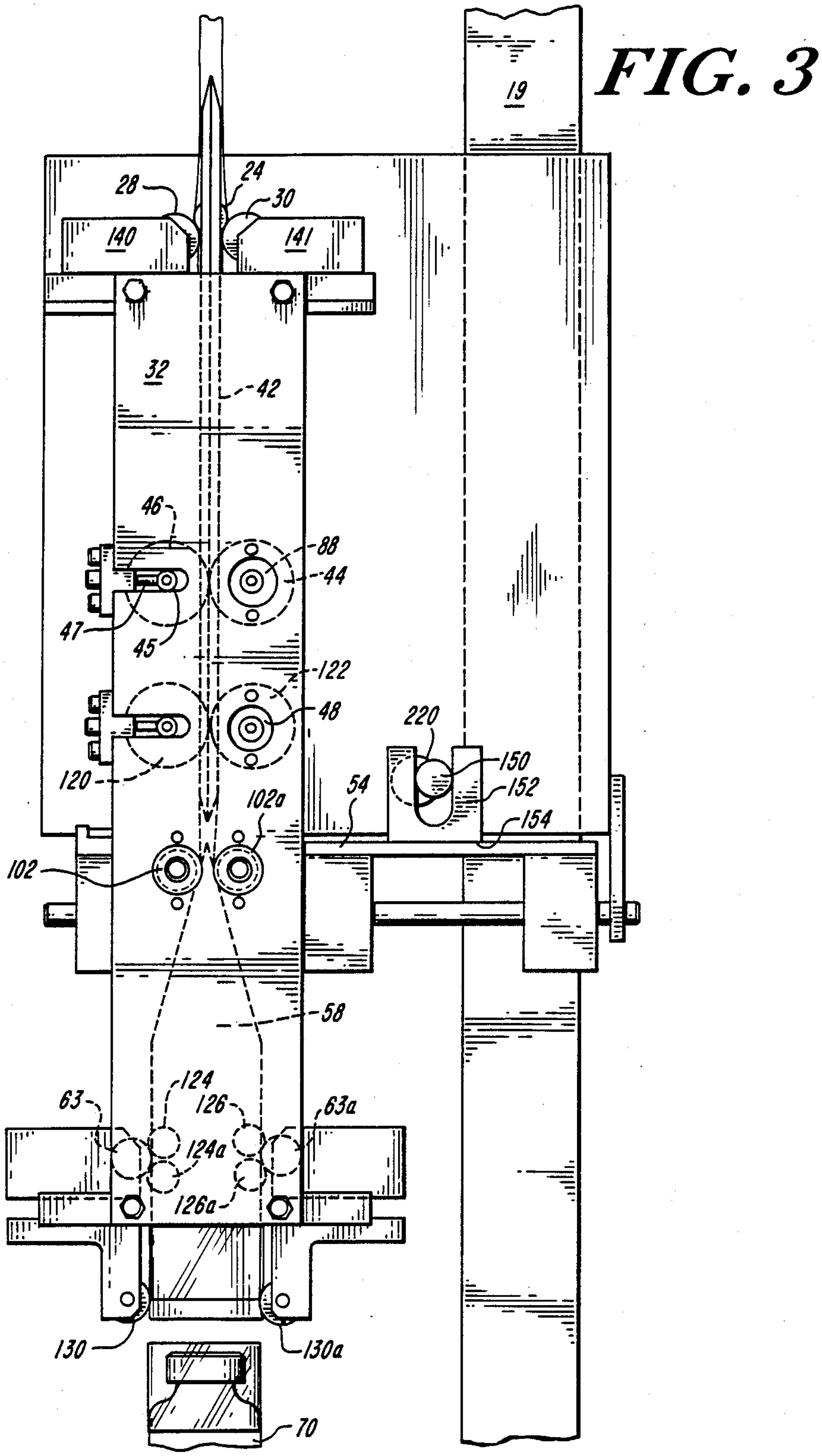
FIG. 3 is an illustration in perspective view from one side of the frame portion of the embodiment of FIG. 1.
Figure 10:
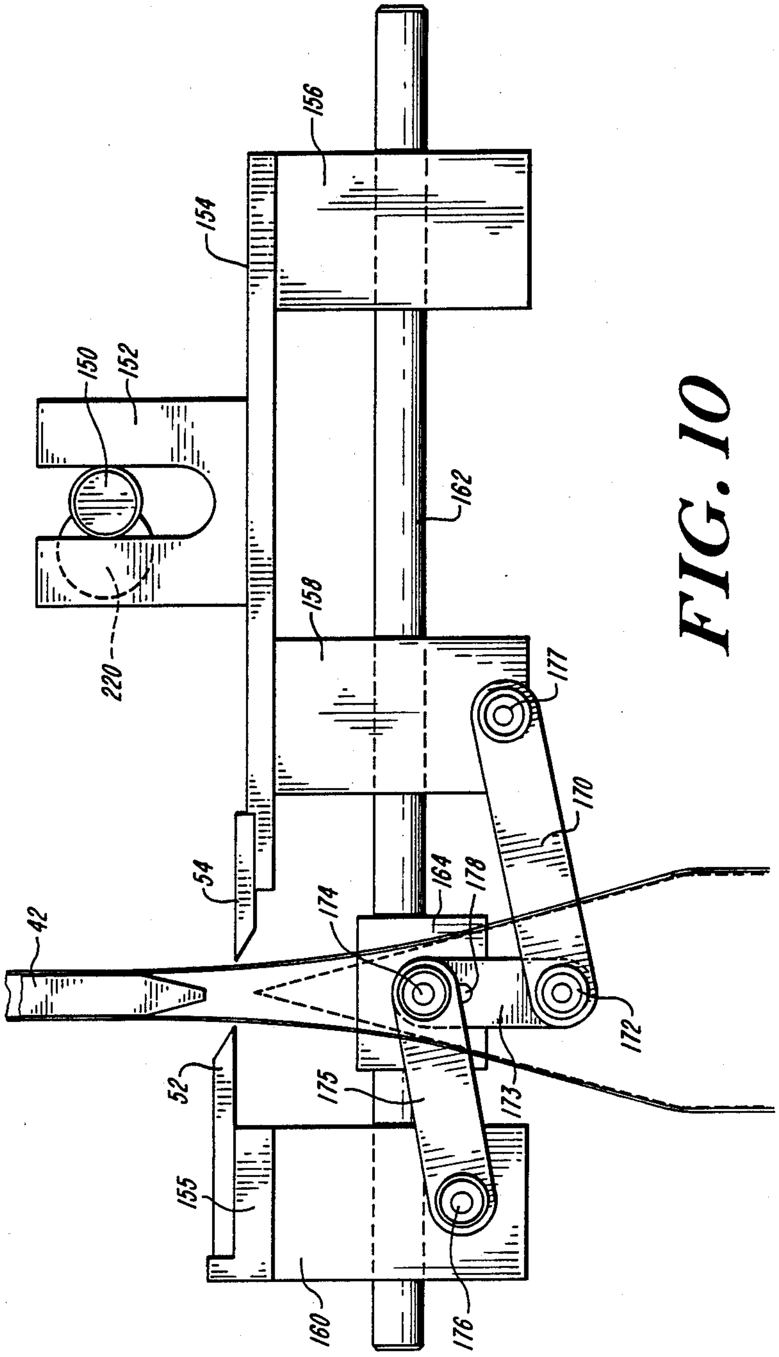
FIGS. 10 and 11 show details of the cutting mechanism included in the embodiment of FIG. 1.
Figure 11:
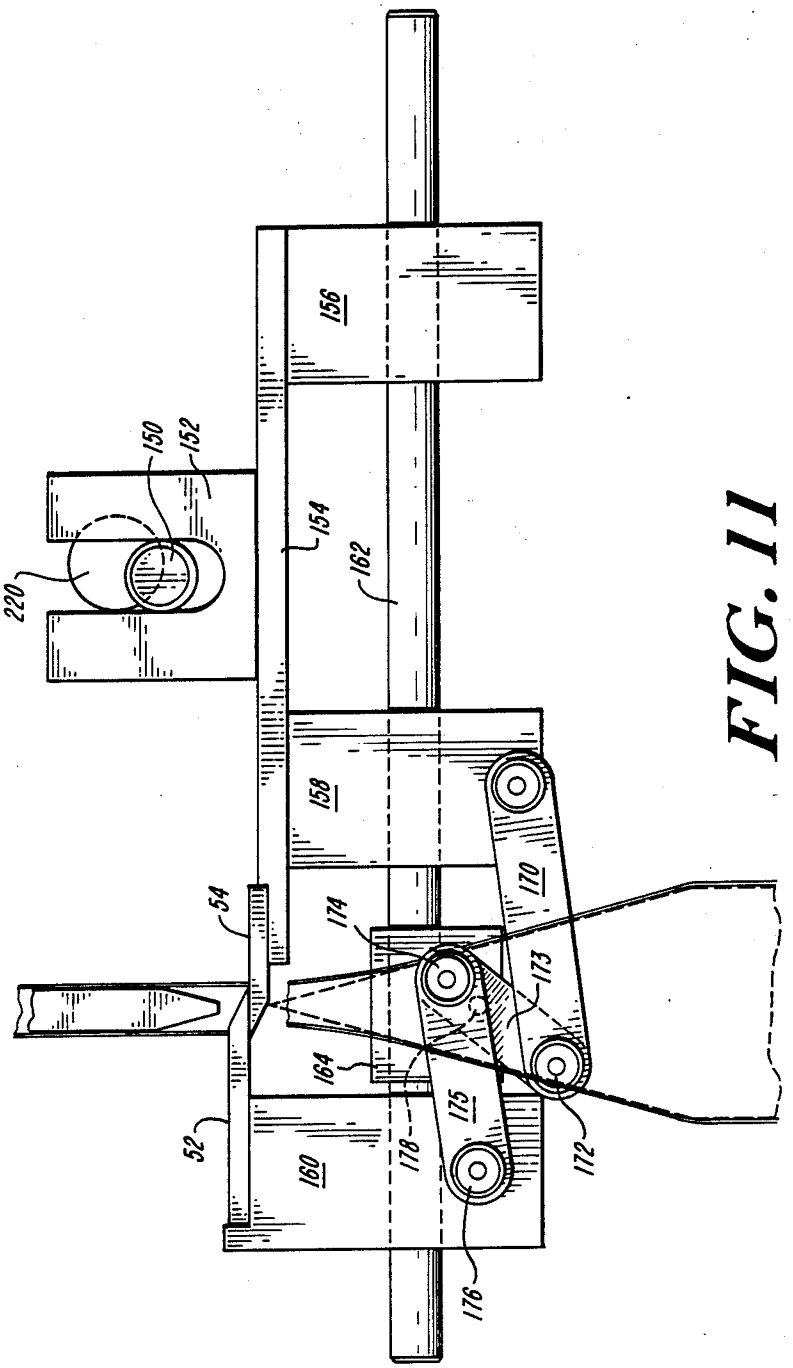
Figure 13:
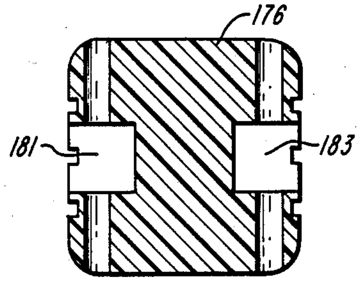
FIG. 13 is a cross sectional view taken through the lines 13—13 of FIG. 12.
Figure 14:
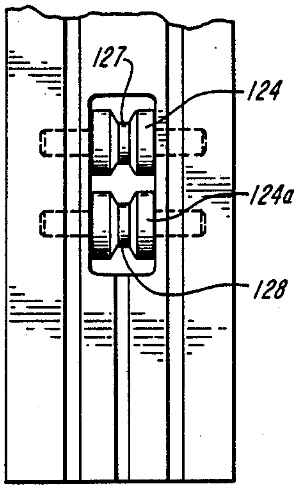
FIG. 14 is a front view of the portion of the mandrel of FIG. 12 with internal roller support members in place.
Figure 15:
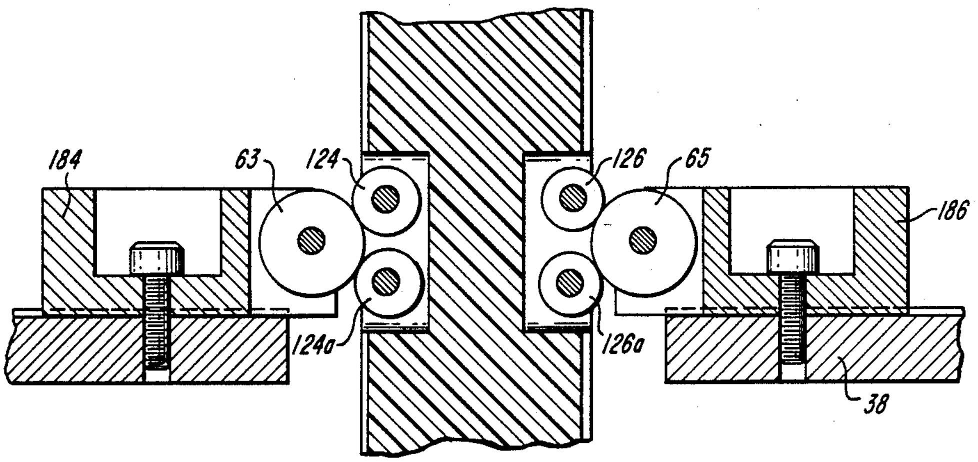
FIG. 15 is an illustration of the roller support mechanism for the floating mandrel in the embodiment of FIG. 1.

The shearing mechanism is illustrated in FIGS. 2, 10 and 11. The purpose of the shearing mechanism is to sever the web while it is in the slightly open position created by the effect of the planar element 42 and in a position just above the upper, thin edge of the floating mandrel. The mechanism includes a pair of shearing blades 52 and 54 (shown in FIG. 10 in the open position), mounted for reciprocal motion transverse to the direction of movement of the web 10. As illustrated in FIG. 11, the blades 52 and 54 come together to slice the web, and are then withdrawn again to the open position illustrated in FIG. 10. The translational motion of the blade is imparted by the translational movement of plate 154, which supports blade 54 and by movement of plate 155 which supports blade 52. The plate 154 is slidably supported on a pair of hardened shafts 162 and 162*a* which are themselves fastened through blocks 164 and 164*a* to the side plates 32 and 34 of the frame. Plate 154 is slidably supported on shaft 162 by a pair of support blocks 158 an 156, each of which contains a linear bearing, (not shown) allowing for the sliding movement. A block (not shown) corresponding to block 158 is slidably mounted on shaft 162*a*. Similarly plate 155 is supported on blocks 160 and 160*a* themselves slidably mounted on shafts 162 and 162*a* respectively. The reciprocating translational motion is provided by rotating cam driver 220 having an eccentric cam 150 rotatably supported on the outer portion of its diameter, with the eccentric cam moving in a U-shaped cam follower 152. As can be seen, rotation of the shaft 220 provides a lateral movement, first inwardly toward the other blade 52, and then outwardly away from it as the eccentric rotates. This motion is translated to the other blade 52 by means of linkages attached between supporting block 158 and 160 with respect to shaft 162 and with an identical linkage attached between block 158*a* and block 160*a* on the opposite shaft 162*a*.

The linkage consists of bar 170 having one end pivoted at 177 on block 158 and the other end pivotally connected to bar 173 at pivot 172. Bar 173 is, in turn, rotatably mounted on block 164 at pivot 178, while bar 175 is pivoted at one end at pivot 174 on bar 173, and at the other end at pivot 176 to block 160. Thus, as plate 154 moves laterally this linkage moves block 160 and therefore plate 155 in the opposite lateral direction. As plate 54, then, closes, so also does plate 52, and as blade 54 withdraws so also does blade 52. The linkage connecting blocks 158*a* and 160*a* is identical. Thus the transverse slicing of web 10 is accomplished by controlling the rotation of cam driver 220, to move the shearing blades inwardly after stopping the feed motion of web 10. After the cut is completed, and the shear blades 52 and 54 withdrawn, the feed motion of web 10 is resumed,

THE DRIVE SYSTEM

With reference to FIG. 4 there is shown a drive mechanism with various power takeoffs from the variable speed drive motor 200. A suitable motor for performing this function is manufactured by Bodine of Chicago, Ill. It will be understood that when the machine is operating, the power to the web feed and the cutting mechanism is turned on and off by the action of a pair of clutches. Clutch 216, which is an electromechanical clutch operated from a control circuit as illustrated in FIGS. 18 and 19, controls the web feed, while electromechanical clutch 218, which is also controlled by the control circuit illustrated in FIG. 18, operates the cutting mechanism. A suitable clutch for the web feed function is model EP-170, manufactured by Warner, South Beloit, Ill.

The output shaft from motor 200 carries on it a timing belt pulley 202 coupled through timing belt 204 to a second timing belt pulley 206 carried on a shaft and coupled through fixed bearings 208 to gear 210. Timing pulley 202 has eighteen teeth, while timing belt 206 has twenty-four teeth. Gear 212 engages gear 210 and effects a 4:1 speed reduction. Output shaft 217 driven by gear 212 is coupled through the previously mentioned clutch 216 to shaft 219 which drives output gear 222. Gear 222 is coupled through idler gear 223 to gear 225. Output roller 46 is driven by gear 225. The gear ratio between gear 222 and gear 225 is 1.7 hence the drive roller 46 rotates more slowly than the output shaft 219 from the clutch. Gear 222 is coupled through idler gear 224 to gear 226 and is also fixed to timing belt pulley 230. Timing belt pulley 230 is coupled by timing belt 233 to a second timing belt pulley 232 with the ratio of teeth in timing belt pulley 232 to that in timing belt 230 providing for an increase in rotational speed of shaft 100 which provides the output rotation from pulley 232. The shaft 100 carries on it cylinder 102 which serves as the drive element for O-rings 104 and 106.

The output speed of cylinder 102, is then somewhat faster than the speed of drive roller 44, hence having a tendency to remove the severed segments of web from floating mandrel 58 more rapidly than the continuous web is fed onto the upper end of that mandrel. Gear 234 carried on shaft 100 is engaged with a 1:1 ratio with gear 238 which provides an output shaft rotating to drive the second O-ring drive cylinder 102*a*, which now rotates in a direction opposite to that of cylinder 102 and therefore drives the O-rings 104*a* and 105*a* in a different rotational direction. As a result the inside strands of the O-rings which bear on the outer surface of the web 10 are both driving downwards in the same linear direction.

Gear 214 which also engages gear 212 is coupled through clutch 218 to the knife drive cam 220. The gear ratio is 2:1 such that the shaft drive on the knife cam is rotating at approximately twice the speed of the output shaft to the web drive 44. The clutch 218 is typically an electric spring clutch such as that manufactured and sold by Warner of South Beloit, Ill. as model CB-5.

THE CONTROL CIRCUIT

FIG. 18 is a block diagrammatic illustration of the control circuit of the banding machine described above. The function of this control circuit is to provide signals to the two electromechanical clutches, one of which controls the web feed and transport and the other of which controls the operation of the cutting mechanism. Since the variable speed motor is actuated all of the time when the machine is operating, the method of stopping the web feed to allow for the cutting mechanism to operate and to restart it after the cutting operation is completed to actuate the clutch mechanism 216 into an "off", braking condition which prevents its output shaft from rotating, and thereafter into an "on" condition which couples the variable motor output through the clutch. The same motor is coupled through the shearing mechanism clutch 218 to operate the shearing mechanism. Here also, in one state the clutch 218 couples the output shaft motion of the variable speed motor to the cutting mechanism to actuate it, and in the other state this motor output is decoupled from this cutting mechanism leaving it stationary.

These operations are keyed by signals from sensor 27, from the position of the cutting mechanism cam 150, and from the conveyor 72. As discussed above the sensor 27 detects the passage of registration marks on the web 10, which marks are longitudinally spaced at a distance substantially equal to the length of the banding segments after cutting Signals from the sensor 27 are amplified in an amplifier 250 and pass to logic control 252 to actuate the clutches 216 and 218 according to the program of this control. An additional input signal to the logic control 252 is provided from the container conveyor 72, to indicate whether or not a container is in position at the banding work station. Finally a "knife stop" signal is provided to logic control 252 from the cutting mechanism cam 150 indicating that cam has stopped rotating and the cutting mechanism is accordingly in a withdrawn position.

The manner in which the logic control 252 is sequentially operated to perform the banding process is illustrated in FIG. 19. When the power is connected so that the machine is in operation, the program starts and then resets the automatic operation, which carries the control to step one.

In step one the control awaits a web feed start signal from the conveyor 72 indicating that a container 70 is in position beneath the banding work station. If no such signal is present the control moves to step two.

At step two when the web feed start signal is received as a result of a container being located at the banding station, an "on" signal is provided to the web feed clutch 216 commencing feeding of the web 10 from the roll 11.

In step three with the clutch 216 on and the web therefore feeding on down through the system, the control logic does not change until a web feed stop signal is received from sensor 27 indicating the passage of a registration mark 21. When such a signal is received, the control provides an output signal to clutch 216 to turn the clutch off, that is to decouple the motor output from the clutch output shaft and at the same time to brake the motion of that shaft. When the clutch is off, the web feed is stopped and the machine is in condition to have the web severed by the cutting mechanism.

In step four, the logic control interrogates for the presence of a "knife stop" signal, and if none is present, provides a "knife on" output signal to activate the cutting mechanism.

In step five when the cutting action is complete, the position of the shearing mechanism cam 150 provides a "knife stop" signal to the logic control 252. The logic control then provides an output signal to the clutch 218 to stop the cutting operation.

In step six the control is in a situation where the cutting mechanism clutch 218 is off and if there is no indication of a "knife stop" signal still present, the logic control resets, putting the control back to the condition of step one.

The "time out" state included in the diagram simply indicates that, if at a particular step, the condition awaited is not met within three full time cycles of the logic sequence, the control times out and stops operation of the machine.

At this point a banding operation has been completed and the logic control is recycled awaiting the next signal indicative of another container being present at the work station. If the machine is on auto cycle, it bypasses step one and automatically goes to step two, commencing a restart of the web feed. This latter cycle provides for continuous automatic cycling of the logic control and therefore of the machine for test purposes.

While a specific sequence control, utilizing particular sensors has been described, it will be understood that the machine can be operated with some variations, while remaining within the concepts of this invention.

What is claimed is therefore:

1. Apparatus for applying flexible plastic bending sleeves on containers comprising;

a generally vertically extending supporting frame;

a roll of continuous flattened tubular web of thin flexible plastic, said roll being rotatably mounted on said frame;

a planar element having a generally rectangular form, the long axis of said rectangle being aligned with the longitudinal dimension of said web, said planar element including rollers mounted within it on a rotational axis parallel to the face of said plane;

a pair of rollers mounted on said frame exterior to said web, said planar element being supported within said web, said pair of exteriorly mounted rollers bearing through said web on the rollers mounted within said planar element;

web feeding means for unrolling said web and feeding it in its flattened form over said planar element to open said web to substantially the cross sectional dimensions of said planar element;

a floating mandrel positioned in the path of said moving web beyond and in general alignment with said planar element, the edge of said mandrel closest to the planar element having transverse cross sectional shape substantially the same as the transverse shape of the edge of said planar element in juxtaposition to it, said mandrel being formed so that its shape changes along the axis of the path of travel of said web to provide a transverse cross sectional shape at its other end substantially the same as the shape of said container in a dimension transverse to the axis of travel of said web;

first mandrel supporting means included within said mandrel, and second mandrel supporting means positioned on said frame exterior to said web in cooperative relationship with said first support means to support said mandrel within said web;

a shearing blade mounted on said frame on one side of the thickness dimension of said web at a longitudinal position between said planar element and said floating mandrel;

sensor means for determining the length of said web which has passed the position of said shearing blade;

means responsive to the sensing of a particular length of web passing said position for momentarily stopping the travel of said web;

means operative when said web is stopped to cause reciprocal motion of said shearing blade transverse to the path of travel of said web to cut said opened web and return to its original position, providing a severed segment of web to form a banding sleeve; and transport means for moving said severed segment of web over said mandrel and onto said container.

2. Apparatus in accordance with claim 1 and further including first and second guide rollers each having an axis of rotation normal to the plane of the face of said planar element, each bearing on opposite longitudinal edges of said planar element.

3. Apparatus for applying flexible plastic bending sleeves on containers comprising;

a generally vertically extending supporting frame;

a roll of continuous flattened tubular web of thin flexible plastic, said roll being rotatably mounted on said frame;

a planar element having a generally rectangular form, the long axis of said rectangle being aligned with the longitudinal dimension of said web, said planar element including rollers mounted within it;

a pair of rollers mounted on said frame exterior to said web, said planar element being supported within said web, said pair of exteriorly mounted rollers bearing through said web on the rollers mounted within said planar element;

web feeding means for unrolling said web and feeding it in its flattened form over said planar element to open said web to substantially the cross sectional dimensions of said planar element;

a floating mandrel positioned in the path of said moving web beyond and in general alignment with said planar element, the edge of said mandrel closest to the planar element having a transverse cross sectional shape substantially the same as the transverse shape of the edge of said planar element in juxtaposition to it, said mandrel being formed so that its shape changes along the axis of the path of travel of said web to provide a transverse cross sectional shape at its other end substantially the same a the shape of said container in a dimension transverse to the axis of travel of said web;

first mandrel supporting means included within said mandrel, and second mandrel supporting means positioned on said frame exterior to said web in cooperative relationship with said first support means to continuously support said mandrel within said web, while allowing for continuous passages of said web between said internal an external support means;

a shearing blade mounted on said frame on one side of the thickness dimension of said web at a longitudinal position between said planar element and said floating mandrel;

sensor means for determining the length of said web which has passed the position of said shearing blade;

means responsive to the sensing of a particular length of web passing said position for momentarily stopping the travel of said web;

means operative when said web is stopped to cause reciprocal motion of said shearing blade transverse to the path of travel of said web to cut said opened web and return to tis original position, providing a severed segment of web to form a banding sleeve; and transport means for moving said severed segment of web over said mandrel and onto said container.

4. Apparatus for applying flexible plastic banding sleeves on containers comprising;

a generally vertically extending support in frame;

a roll of continuous flattened tubular web of thin flexible plastic, said roll being rotatably mounted on said frame;

a planar element having a generally rectangular form, the long axis of said rectangle being aligned with the longitudinal dimension of said web, said planar element including rollers mounted within it;

a pair of rollers mounted on said frame exterior to said web, said planar element being supported within said web, said pair of exteriorly mounted rollers bearing through said web on the rollers mounted within said planar element;

web feeding means for unrolling said web and feeding it in its flattened form over said planar element to open said web to substantially the cross sectional dimensions of said planar element;

a floating mandrel positioned in the path of said moving web beyond and in general alignment with said planar element, the edge of said mandrel closest to the planar element having a transverse cross sectional shape substantially the same as the transverse shape of the edge of said planar element in juxtaposition to it, said mandrel being formed so that its shape changes along the axis of the path of travel of said web to provide a transverse cross sectional shape at its other end substantially the same as the shape of said container in a dimension transverse to the axis of travel of said web;

first mandrel supporting means included within said mandrel, said first mandrel supporting means including at least one pair of rollers mounted adjacent to opposite sides of said mandrel and second mandrel supporting means positioned on said frame exterior to said web, said second mandrel supporting means including at least one roller on each one of opposite sides of said mandrel, each of said rollers in said second mandrel supporting means bearing through said web onto each roller in said first mandrel supporting means, said rollers being positioned with respect to each other to continuously support said mandrel;

a shearing blade mounted on said frame on one side of the thickness dimension of said web at a longitudinal position between said planar element and said floating mandrel;

sensor means for determining the length of said web which has passed the position of said shearing blade;

means responsive to the sensing of a particular length of web passing said position for momentarily stopping the travel of said web;

means operative when said web is stopped to cause reciprocal motion of said shearing blade transverse to the path of travel of said web to cut said opened web and return to its original position, providing a severed segment of web to form a banding sleeve; and transport means for moving said severed segment of web over said mandrel and onto said container.

5. Apparatus in accordance with any one of claims 1, 2 and 3 wherein said transport means includes first and second pairs of O-rings positioned to lie longitudinally in close juxtaposition o to opposite surfaces of said floating mandrel, and drive means for moving said first and second pairs of O-rings in the direction of travel of said web in conjunction with the operation of said means for unrolling the web and feeding it over said planar element, and ad third pair of O-rings placed in juxtaposition to the same opposite faces as said first and second pairs of O-rings, one of the O-rings in said third pair being coupled to the drive of the first pair of O-rings in juxtaposition to that face and the second one of said third pair of O-rings being coupled to the drive of said second pair of O-rings in close juxtaposition to the opposite face of said mandrel, each one of said third pair of O-rings extending longitudinally beyond the mandrel in a direction to continue to transport already severed segments of said web from said mandrel onto said containers.

6. Apparatus in accordance with any one of claims 1, 2, 3 or 4 wherein said planar element is formed with a generally rectangular opening through it and wherein said web feeding means comprise first and second rollers adjacent to opposite faces of said planar element exterior to said web and fastened to said frame, said rollers forming a nip in said opening through said planar element, said web feeding means passing said web through said nip and rotating one of said rollers to effect travel of said web in a direction generally aligned with the longitudinal axis of said planar element.

7. Apparatus in accordance with any one of claim 1, 2, 3 or 4 and including a second shearing blade positioned on the opposite side of said web and wherein said means operative when said web is stopped also provides for substantially simultaneous reciprocal action of said second shearing blade such that said blades meet at said web.

8. Apparatus in accordance with any one of claims 1, 2, 3 or 4 wherein said apparatus includes one electric motor, and a clutch for coupling said electric motor to said web feeding means, said electric motor running all of the time said apparatus is operating, said clutch being actuated to provide said rotational motor drive as an output in one state and to decouple said motor drive in a second state, and wherein said sensor means controls the state of said clutch.

9. Apparatus in accordance with any one of claims 1, 2, 3 or 4 and wherein said planar element is formed as a split element having two separate longitudinal halves and adjustable means for fastening together the two halves to control the width of the gap between said halves so that the outer width of said planar element may be varied as a function of longitudinal position.

10. Apparatus in accordance with any one of claims 1, 2, 3 or 4 wherein said transport means comprises two pairs of O-rings positioned to lie longitudinally in close juxtaposition to opposite surfaces of said floating mandrel exterior to said web, and drive means for moving said O-rings in the direction of travel of said web in conjunction with the operation of said means for unrolling said web and feeding it over said planar element.

11. Apparatus in accordance with any one of claims 1, 2, 3 or 4 wherein said web of thin plastic material has imprinted on it longitudinally spaced registration marks and wherein said sensor means is positioned ion juxtaposition to said web at a point before said web reaches said pair of shearing blades, said sensor sensing the passing of said registration marks through it;

and wherein said means response to the sensing of a particular length of web comprises means responsive to the sensing of a registration by said sensor.

12. Apparatus in accordance with claim 4 wherein said transport means includes first and second pairs of O-rings positioned to lie longitudinally in close juxtaposition to opposite surfaces of said floating mandrel, and drive means for moving said first and second pairs of O-rings in the direction of travel of said web in conjunction with the operation of said means for unrolling the web and feeding it over said planar element, and a third pair of O-rings placed in juxtaposition to the same opposite faces as said first and second pairs of O-rings, one of the O-rings in said third pair being coupled to the drive of the first pair of O-rings in juxtaposition to that face and the second one of said third pair of O-rings being coupled to the drive of said second pair of O-rings in close juxtaposition to the opposite face of said mandrel, each one of said third pair of O-rings extending longitudinally beyond the mandrel in a direction to continue to transport already severed segments of said web from said mandrel onto said containers.

13. Apparatus in accordance with claim 12 wherein at least one of each pair of said rollers bearing on each other in said first mandrel support means are grooved to allow said O-rings to pass between said rollers without distorting the shape of said O-rings.

14. Apparatus in accordance with claim 4 and further including first and second guide rollers each having an axis of rotation normal to the plane of the face of said planar element, each bearing on opposite longitudinal edges of said planar elements.

15. Apparatus for applying flexible plastic bandage sleeves on containers comprising;

a generally vertically extending supporting frame;

a roll of continuous flattened tubular web of thin flexible plastic, said roll being rotatably mounted on said frame;

a planar element having a generally rectangular form, the long axis of said rectangle being aligned with the longitudinal dimension of said web, said planar element including rollers mounted within it;

a pair of rollers mounted on said frame exterior to said web, said planar element being supported within said web, said pair of exteriorly mounted rollers bearing through said web on the rollers mounted within said planar element;

web feeding means for unrolling said web and feeding it in its flattened form over said planar element to open said web to substantially the cross sectional dimensions of said planar element;

a floating mandrel positioned in the path of said moving web beyond and in general alignment with said planar element, the edge of said mandrel closest to the planar element having a transverse cross sectional shape substantially the same as the transverse shape of the edge of said planar element in juxtaposition to it, said mandrel being formed so that its shape changes along the axis of the path of travel of said web to provide a transverse cross sectional shape at its other end substantially the same as the shape of said container in a dimension transverse to the axis of travel of said web;

first mandrel supporting means included within said mandrel, and second mandrel supporting means positioned on said frame exterior to said web in cooperative relationship with said first support means to support said mandrel within said web;

a shearing blade mounted on said frame on one side of the thickness dimension of said web at a longitudinal position between said planar element and said floating mandrel;

sensor means for determining the length of said web which has passed the position of said shearing blade;

means responsive to the sensing of a particular length of web passing said position for momentarily stopping the travel of said web;

means operative when said web is stopped to cause reciprocal motion of said shearing blade transverse to the path of travel of said web to cut said opened web and return to its original position, providing a severed segment of web to form a banding sleeve; and transport means for moving said severed segment of web over said mandrel and onto said container, wherein said apparatus includes one electric motor, and a clutch for coupling said electric motor to said web feeding means, said electric motor running all of the time said apparatus is operating, said clutch being actuated to provide said rotational motor drive as an output in one state and to decouple said motor drive in a second state, and wherein said sensor means controls the state of said clutch.

16. Apparatus in accordance with claim 15 wherein a second clutch is coupled to the output of said electric motor to couple the drive output of said motor to said means for causing reciprocal motion of said shearing blade when said second clutch is in one condition, and to decouple said output drive from said means when said second clutch is in a second condition.

17. Apparatus in accordance with claim 16 wherein said means operative to cause reciprocal motion includes mechanical means for convrting said rotational output drive from said motor to reciprocal motion.

18. Apparatus in accordance with claim 16 wherein said transport means is driven through the same clutch that coupled said web feedmeans but at a speed faster in the direction of travel of said web than said web feed means.

19. Apparatus for applying flexible plastic banding sleeves on containers comprising;

a generally vertically extending supporting frame;

a roll of continuous flattened tubular web of thin flexible plastic, said roll being rotatably mounted on said frame;

a planar element having a generally rectangular form, the long axis of said rectangle being aligned with the longitudinal dimension of said web, said planar element including rollers mounted within it;

a pair of rollers mounted on said frame exterior to said web, said planar element being supported within said web, said pair of exteriorly mounted rollers bearing through said web on the rollers mounted within said planar element;

web feeding means for unrolling said web and feeding it in its flattened form over said planar element to open said web to substantially the cross sectional dimensions of said planar element;

a floating mandrel positioned in the path of said moving web beyond and in general alignment with said planar element, the edge of said mandrel closest to the planar element having a transverse cross sectional shape substantially the same as the transverse shape of the edge of said planar element in juxtaposition to it, said mandrel being formed so that its shape changes along the axis of the path of travel of said web to provide a transverse cross sectional shape at its other end substantially the same as the shape of said container in a dimension transverse to the axis of travel of said web;

first mandrel supporting means included within said mandrel, and second mandrel supporting means positioned on said frame exterior to said web in cooperative relationship with said first support means to support said mandrel within said web;

a shearing blade mounted on said frame on one side of the thickness dimension of said web at a longitudinal position between said planar element and said floating mandrel;

sensor means for determining the length of said web which has passed the position of said shearing blade;

means responsive to the sensing of a particular length of web passing said position for momentarily stopping the travel of said web;

means operative when said web is stopped to cause reciprocal motion of said shearing blade transverse to the path of travel of said web to cut said opened web and return to its original position, providing a severed segment of web to form a banding sleeve; and transport means for moving said severed segment of web over said mandrel and onto said container, and wherein said planar element is formed as a split element having two separate longitudinal halves and adjustable means for fastening together the two halves to control the width of the gap between said halves so that the outer width of said planar element may be varied as a function of longitudinal position.

20. Apparatus for applying flexible plastic banding sleeves on containers comprising;

a generally vertically extending supporting frame;

a roll of continuous flattened tubular web of thin flexible plastic, said roll being rotatably mounted on said frame;

a planar element having a generally rectangular form, the long axis of said rectangle being aligned with the longitudinal dimension of said web, said planar element including rollers mounted within it;

a pair of rollers mounted on said frame exterior to said web, said planar element being supported within said web, said pair of exteriorly mounted rollers bearing through said web on the rollers mounted within said planar element;

web feeding means for unrolling said web and feeding it in its flattened form over said planar element to open said web to substantially the cross sectional dimensions of said planar element;

a floating mandrel positioned in the path of said moving web beyond and in general alignment with said planar element, the edge of said mandrel closest to the planar element having a transverse cross sectional shape substantially the same as the transverse shape of the edge of said planar element in juxtaposition to it, said mandrel being formed so that its shape changes along the axis of the path of travel of said web to provide a transverse cross sectional shape at its other end substantially the same as the shape of said container in a dimension transverse to the axis of travel of said web;

first mandrel supporting means included within said mandrel, and second mandrel supporting means positioned on said frame exterior to said web in cooperative relationship with said first support means to support said mandrel within said web;

a shearing blade mounted on said frame on one side of the thickness dimension of said web at a longitudinal position between said planar element and said floating mandrel;

sensor means for determining the length of said web which has passed the position of said shearing blade;

means responsive to the sensing of a particular length of web passing said position for momentarily stopping the travel of said web;

means operative when said web is stopped to cause reciprocal motion of said shearing blade transverse to the path of travel of said web to cut said opened web and return to its original position, providing a severed segment of web to form a banding sleeve; and transport means for moving said severed segment of web over said mandrel and onto said container, wherein said transport means comprises first and second pairs of O-rings positioned to lie longitudinally in close juxtaposition to opposite surfaces of said floating mandrel, and drive means for moving said O-rings in the direction of travel of said web in conjunction with the operation of said means for unrolling the web and feeding it over said planar element.

21. Apparatus in accordance with claim 20 and further including a third pair of O-rings placed in juxtaposition to the same opposite faces as said first and second pairs of O-rings, one of the O-rings in said third pair being coupled to the drive of the first pair of O-rings in juxtaposition to that face and the second one of said third pair of O-rings being coupled to the drive of said second pair of O-rings in close juxtaposition to the opposite face of said mandrel, each one of said third pair of O-rings extending longitudinally beyond the mandrel in a direction to continue to transport already severed segments of said web from said mandrel onto said containers.

22. Apparatus in accordance with either one of claim 20 or 21 wherein said drive means moves all of said O-rings in the direction of travel of said web at a faster speed then said web feeding means feeds said web.

23. Apparatus for applying flexible plastic banding sleeves on containers comprising;

a generally vertically extending supporting frame;

a roll of continuous flattened tubular web of thin flexible plastic, said roll being rotatably mounted on said frame;

a planar element having a generally rectangular form, the long axis of said rectangle being aligned with the longitudinal dimension of said web, said planar element including rollers mounted within it, the axis of rotation of said rollers being parallel to the planar surface of said planar element;

a pair of rollers mounted on said frame exterior to said web, said planar element being supported within said web, said pair of exteriorly mounted rollers bearing through said web on the rollers mounted within said planar element;

web feeding means for unrolling said web and feeding it in its flattened form over said planar element to open said web to substantially the cross sectional dimensions of said planar element;

a floating mandrel positioned in the path of said moving web beyond and in general alignment with said planar element, the edge of said mandrel closest to the planar element having a transverse cross sectional shape substantially the same as the transverse shape of the edge of said planar element in juxtaposition to it, said mandrel being formed so that its shape changes along the axis of the path of travel of said web to provide a transverse cross sectional shape at its other end substantially the same as the shape of said container in a dimension transverse to the axis of travel of said web;

first mandrel supporting means included within said mandrel, and second mandrel supporting means positioned on said frame exterior to said web in cooperative relationship with said first support means to continuously support said mandrel within said web while allowing said web to pulse continuously therethrough;

a pair of shearing blades mounted on said frame on either side of the thickness dimension of said web at a longitudinal position between said planar element and said floating mandrel;

sensor means for determining the length of said web which has passed the position of said shearing blade;

means responsive to the sensing of a particular length of web passing said position for momentarily stopping the travel of said web;

means operative when said web is stopped to cause reciprocal motion of said shearing blade transverse to the path of travel of said web to cut said opened web and return to their original position, providing a severed segment of web to form a banding sleeve; and transport means for moving said severed segment of web over said mandrel and onto said container, and further including blade support means journaled on a pair of shafts, said shearing blades each being mounted on separate one of said support means, said means for causing reciprocal motion being coupled directly to one of said support members; and linkage means interconnected with the support member carrying each of said shearing blades such that when one of said members moves in a first transverse direction toward engagement of said shearing blades, the other shearing blade supporting members moves in the opposite direction toward engagement, and when one of said shearing blades moves in a transverse direction away from engagement, the other of said shearing blades also moves away from said engagement.

* * * * *

UNITED STATES PATENT AND TRADEMARK OFFICE

CERTIFICATE OF CORRECTION

PATENT NO. : 4,922,683

DATED : May 8, 1990

INVENTOR(S) : Thomas Connolly

It is certified that error appears in the above-identified patent and that said Letters Patent is hereby corrected as shown below:

Column 3, line 57 delete "tYpically" and insert --typically--.

Column 4, line 31 after "for" insert --providing a--.

Column 8, line 65 after "cutting" insert --.--.

Column 9, line 66 delete "bending" and insert --banding--.

Column 10, line 59 delete "bending" and insert --banding--.

Column 11, line 19 delete "a" and insert --as--.

Column 11, line 43 delete "tis" and insert --its--.

Column 11, line 50 delete "support in" and insert --supporting--.

Column 12, line 45 after "juxtaposition" delete "o".

UNITED STATES PATENT AND TRADEMARK OFFICE

CERTIFICATE OF CORRECTION

PATENT NO. : 4,922,683

DATED : May 8, 1990

INVENTOR(S) : Thomas Connolly

It is certified that error appears in the above-identified patent and that said Letters Patent is hereby corrected as shown below:

Column 12, line 50 delete "ad" and insert --a--.

Column 14, line 8 delete "bandage" and insert --banding--.

Column 15, line 12 delete "convrting" and insert --converting--.

Column 15, line 16 delete "feedmeans" and insert --feed means--.

Signed and Sealed this

Nineteenth Day of January, 1993

*Attest:*

DOUGLAS B. COMER

*Attesting Officer* *Acting Commissioner of Patents and Trademarks*